Nov. 15, 1960 P. H. SAVET 2,959,958
APPARATUS FOR OBTAINING TRUE ATMOSPHERIC DATA
Filed Oct. 5, 1954
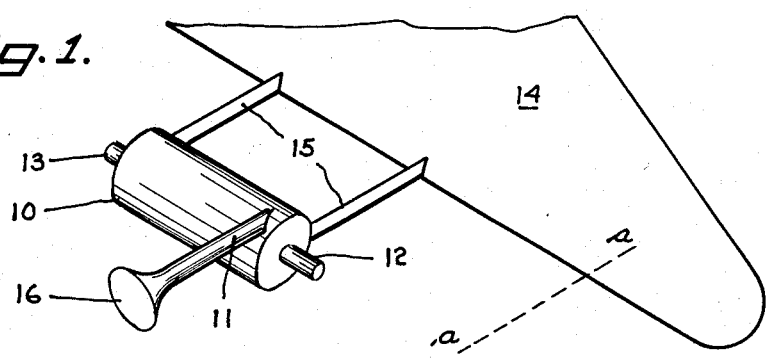
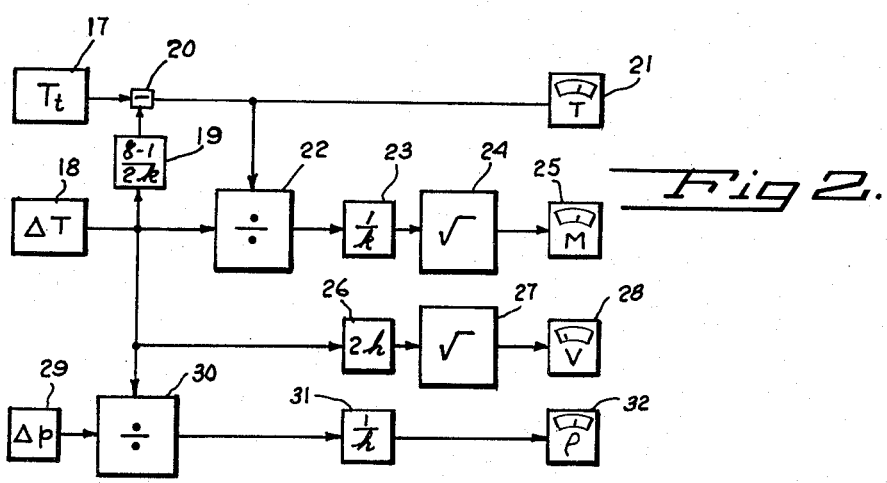
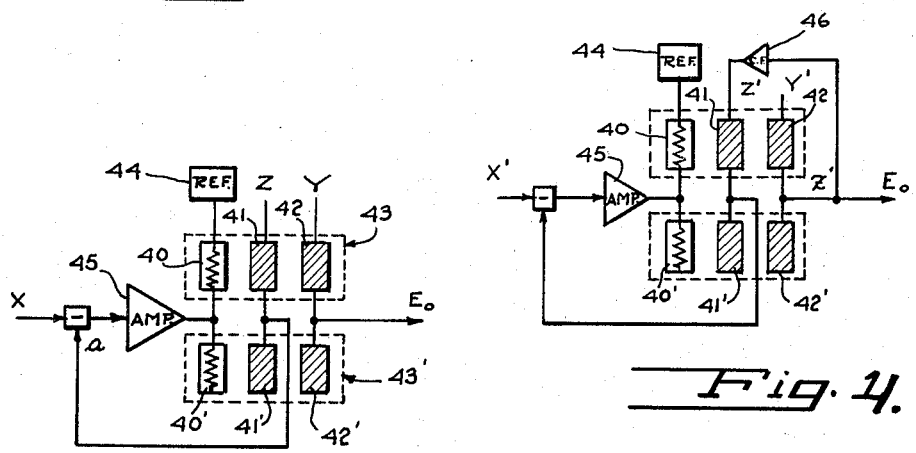
INVENTOR.
PAUL H. SAVET
BY
Raymond A. Paquin
ATTORNEY.

United States Patent Office 2,959,958
Patented Nov. 15, 1960

2,959,958

APPARATUS FOR OBTAINING TRUE ATMOSPHERIC DATA

Paul H. Savet, Westbury, N.Y., assignor to American Bosch Arma Corporation, a corporation of New York Filed Oct. 5, 1954, Ser. No. 460,344

8 Claims. (Cl. 73—181)

The present invention relates to airborne instruments and has particular reference to indicators and method of obtaining true atmospheric data.

A knowledge of the true atmospheric conditions, such as air temperature and density, true airspeed or velocity and Mach number of the craft is required for proper operation of modern aircraft. The outside absolute air temperature sensed by an airborne thermometer indicates a temperature greatly in excess of the static or true absolute temperature. Similarly the density of air measured by means of the total temperature and pressure is in excess of the true air density.

The present invention determines the true static air temperature and density and at the same time is adapted to indicate the true velocity and Mach number of the aircraft. This invention uses a device known as a vortex tube for determination of the true temperature. The other values are determined by a computer in combination with the uncorrected airspeed indicator and the vortex tube.

For a clearer understanding of the theoretical aspects and practical construction of the invention reference may be had to the accompanying diagrams, in which, Figure 1 is a diagram of the vortex tube;

Figure 2 is a schematic block diagram of the computer;

Figure 3 is a schematic diagram of a preferred divider network; and

Figure 4 is a schematic diagram of a preferred square root extractor network.

In the following discussion let $cp$ = specific heat of air at constant pressure
$cv$ = specific heat of air at constant volume
$\gamma = cp/cv = 1.4$
$T$ = static or true air temperature (° R.)
$T_t$ = total air temperature (° R.)
$p$ = static pressure
$p_t$ = total pressure
$V$ = true air speed
$a$ = velocity of sound $=\sqrt{Rg\gamma T}=\sqrt{K(\gamma-1)T}$
$\cong 49\sqrt{T}$ ft./sec.
$M$ = Mach number $= V/a$
$K = Jcpg = 6080$ (ft./sec.)$^2$/° F.
$J$ = mechanical equivalent of heat = 778 ft.lb./B.t.u.
$g$ = acceleration of gravity = 32.17 ft./sec.$^2$
$\rho$ = density
$R$ = gas constant = 53.35 ft.lb./lb. ° F.

An analysis of a device known as a Ranque tube, Hilsch tube or Vortex tube is presented in an article "Aero-Thermo-Dynamic Phenomena in a Revloving Fluid Motion" by Paul H. Savet, published in the Transactions of New York Academy of Sciences, Serial II, vol. 14, No. 2, December 1951, pages 86–93.

This device is illustrated in Figure 1 and consists essentially of a thermally insulated, closed cylindrical tube 10 to which air at high pressure is supplied through an entrance nozzle 11. The nozzle 11 is located tangentially to the inner circular wall of the tube 10, close to the end 12. Within the tube 10 a whirling motion is communicated to the air which expands to the pressures prevailing at the discharge ends 12 and 13.

It has been discovered that the air stream discharged at cold end 12 (close to nozzle 11) is much colder than the entrance air, while the air discharged at the other or hot end 13 is much hotter than the entrance air. If the temperature of the entrance air is $T_t$ and the temperature of the cold discharge is $T_c$, then $$\Delta T = T_t - T_c = kTM^2 \quad (1)$$

where $k$ is a constant coefficient of calibration which must be determined in the laboratory and is dependent only on the geometry of the vortex tube itself.

It is known that the pressure head $\Delta p$, or $p_t - p$, is $$\Delta p = p_t - p = \frac{1}{2}\rho V^2 = \frac{1}{2}\rho a^2 M^2 = \frac{p}{2}Rg\gamma TM^2 \quad (2)$$

Dividing 2 by 1

$$\frac{\Delta p}{\Delta T} = \frac{p}{2}\frac{Rg\gamma}{k} = \rho h \quad (3)$$

where $$h = \frac{Rg\gamma}{2k}$$

It is know that the total temperature exceeds the static temperature by a corrective term proportional to the velocity squared. Thus, $$T_t = T + \frac{V^2}{2K} \quad (4)$$

where the symbols are as previously defined. Since $$M = \frac{V}{a}$$

and $a^2 = K(\gamma-1)T$, it will be seen from Equations 4 and 1 that $$T = T_t - T\frac{\gamma-1}{2}M^2 = T_t - \frac{\Delta T}{k}\frac{\gamma-1}{2} \quad (5)$$

Also, from 2 and 3

$$V^2 = \frac{2\Delta p}{\rho} = 2h\Delta T \quad (6)$$

whence, $$V = \sqrt{2h\Delta T} \quad (7)$$

Rewriting Equation 1

$$M^2 = \frac{\Delta T}{kT} \text{ or } M = \sqrt{\frac{\Delta T}{kT}} \quad (8)$$

And rewriting Equation 3

$$\rho = \frac{\Delta p}{h\Delta T} \quad (9)$$

It will be seen that if a vortex tube is mounted on an aircraft so that nozzle 11 is directed against the air velocity, and the difference in temperature of the entrance air and cold discharge of the vortex tube, the total temperature of the entrance air, and the pressure head are known, the true static temperature can be determined by Equation 5, the true air velocity can be determined by Equation 7, the Mach number can be found by Equation 8 and the true air density can be found by Equation 9.

To this end, a vortex tube 10 may be mounted ahead of the leading edge of the aircraft wing tip 14 by supports or booms 15. In order to provide maximum ram pressure created by the motion of the aircraft a scoop 16 is connected to the nozzle 11. Also, a Pitot or Prandtl tube (not shown) for measurement of pressure head is mounted on the wing tip 14 at the position marked "aa."

It will be understood that this is merely a suggested mounting method and it may be found preferable to mount the vortex tube and Pitot tube within the wing or fuselage rather than by the boom method suggested above. Referring now to Figure 2, a block diagram of the computer for determining T, M, V, and $\rho$ from measured values of $T_t$, $\Delta T$ and $\Delta p$ is shown. The term "proportional to" when applied to a voltage is intended to indicate that the magnitude of the voltage is proportional to a value while the polarity of the voltage corresponds to the sign of that value.

Thermocouple junctions may be inserted into the path of the entrance air at nozzle 11 and the discharge air at port 12 and electrical signals proportional to $T_t$ and $\Delta T$ are provided thereby. The boxes 17 and 18 represent these sources of electrical signals. Means other than thermocouples may be used for providing the $T_t$ and $\Delta T$ voltage, if convenient.

The $\Delta T$ signal is multiplied by $$\frac{\gamma-1}{2k}$$

in the scaling device 19 and the output of device 19 is subtracted from the $T_t$ signal from source 17 at 20 according to Equation 5. The difference voltage $$\left(T_t - \frac{\Delta T(\gamma-1)}{2k}\right)$$

is proportional to the static temperature T. Therefore, T may be indicated on a voltmeter 21 which is calibrated to read the temperature T directly. Scaling devices, such as device 19, may be resistors or transformers, for example.

The $\Delta T$ output from source 18 is divided by the T voltage from point 20 in the dividing device 22 to produce a voltage proportional to $$\frac{\Delta T}{T}$$

which is multiplied by $1/k$ in the scaling device 23. The output of the scaling device 23 is applied to the square root extracting device 24 and the output $$\sqrt{\frac{\Delta T}{kT}}$$

which is proportional to M according to Equation 8, may be read on the properly calibrated voltmeter 25.

The dividing device 22 and the square root extracting device 24 are preferably of the type employing thermal units as the sensitive elements. The divider, for example, may be the type disclosed in U.S. patent application Serial No. 261,255, filed December 12, 1951, for "Signal Multiplying Device" by Joseph Statsinger, assigned to Arma Corporation, now Patent No. 2,841,329, issued July 1, 1958. Its use as a dividing circuit is also clearly described in an article "Analog Computing by Heat Transfer," by Paul H. Savet published in the February 1954 issue of "Tele-Tech and Electronic Industries," pages 101 and 122. For completeness however, the divider will be described briefly using the pictorial representations found in the above mentioned article in Figure 3.

Referring now to Figure 3, a heater 40 and two heat sensitive resistors 41 and 42 are in close thermal contact in the envelope 43 and similar heater 40' and two heat sensitive resistors 41' and 42' are in close thermal contact in the envelope 43'. The heaters 40 and 40' are equally energized by a constant reference voltage 44 and are differentially energized by the output of a high gain amplifier 45. The resulting unbalance in temperature of the resistors 40 and 40' is directly transmitted to the sensing resistors 41 and 41' (having a high temperature coefficient of resistance) resulting in a corresponding unbalance in their resistances. Resistors 41 and 41' are energized by an input voltage proportional to a value Z, producing a signal output $a$ which is proportional to the product of Z and the unbalance in the resistance of resistors 41 and 41'. The voltage $a$ is fed back degeneratively with the input signal, proportional to a value X, to the input of the amplifier 45. Since the gain of the amplifier 45 is high it will be found that the unbalance, U, is substantially equal to the ratio of $$\frac{X}{Z}$$

Thus, $$U = \frac{X}{Z}$$

The same amount of unbalance is also transmitted to the second pair of sensing resistors 42 and 42', since they are in intimate thermal contact with the heaters. The resistors 42 and 42' are energized by a voltage supply proportional to a value Y, and the expression for the output voltage $E_0$ is therefore, $$E_0 = (Y)(U)$$

$$= \frac{XY}{Z}$$

Now, if the input X is proportional to $\Delta T$, the input Z is proportional to T and the input Y is constant, the output $E_0$ will be proportional to $$\frac{\Delta T}{T}$$

which is the desired signal output.

Figure 4 illustrates a typical thermally operated square root extractor, such as may be used for the device 24. The circuit of Figure 4 resembles that of Figure 3, but the output of the second pair of sensing resistors 42 and 42' is used as the input Z' to the first pair of sensing resistors 41 and 41'. A cathode follower 46 may be used between the output from resistors 42 and 42' and the input to resistors 41 and 41' if the impedance values are such that the cathode follower is required.

Following the analysis of Figure 3, it will be seen that in Figure 4

$$X' = Z'U$$

where U is the unbalance in resistance. Also, $$Z' = Y'U$$

whence $$Z' = Y'\left[\frac{X'}{Z'}\right]$$

or $$Z'^2 = X'Y'$$

and $$Z' = \sqrt{X'Y'}$$

or $$Z' = C\sqrt{X'}$$

when Y' is constant.

Thus, if X' is proportional to $M^2$, the output Z' is proportional to M which is the output required of the square root extractor 24.

Returning now to Figure 2, the $\Delta T$ signal from source 18 is multiplied by $2h$ in the scaling device 26 and the output thereof is applied to the square root extractor 27. The output of the extractor 27 is proportional to $\sqrt{2h\Delta T}$ which according to Equation 7 is proportional to V. The value of V may be read on a suitably calibrated voltmeter 28. The square root extractor 27 is preferably of the type shown in Figure 4.

The pressure head, $\Delta p$, is determined by a Pitot tube which is adapted to produce an electrical voltage proportional in magnitude to $\Delta p$ at the source 29. The $\Delta p$ signal and the $\Delta T$ signal from source 18 are combined in the dividing network 30 (which is similar to that shown in Fig. 3) to produce a voltage proportional to $$\frac{\Delta p}{\Delta T}$$

The output of divider 30 is multiplied by $$\frac{1}{h}$$

in the scaling device 31. The output of the scaling device 31, proportional to $$\frac{\Delta p}{h \Delta T}$$

is proportional to the density $\rho$ in accordance with Equation 9, and $\rho$ may be read on the properly calibrated voltmeter 32.

I claim:

1. In a device of the character described, a vortex tube mounted on an aircraft, means for producing a first voltage proportional to the temperature difference between the air externally of said vortex tube and the cold discharge of said vortex tube, means for producing a second voltage proportional to the air temperature externally of said vortex tube, an electrical means for modifying said first voltage according to $$\frac{\gamma-1}{2k}$$

means for combining said first modified voltage and said second voltage to produce a third voltage according to the difference between said combined voltages, first signal dividing means connected to said third and first voltages to produce a fourth voltage, first square root extracting means connected to said fourth voltage to produce a fifth voltage, means carried by the aircraft for measuring the difference between the total air pressure and static air pressure, means for producing a sixth voltage proportional to said pressure difference and second signal dividing means connected to said first and sixth voltages to produce a seventh voltage and separate indicating means connected to said third, fifth and seventh voltages.

2. In a device of the character described, a vortex tube mounted on an aircraft, means for measuring the difference of temperature externally of said vortex tube and the cold discharge of said vortex tube, means for multiplying said difference by $$\frac{\gamma-1}{2k}$$

means for measuring the total air temperature and means for subtracting said product from said total air temperature to obtain the static air temperature, means for dividing said difference by said static air temperature, means for obtaining the square root of said quotient to obtain an indication of the Mach number, means for multiplying said difference by $$\frac{Rg\gamma}{k}$$

means for obtaining the square root of said second product to obtain true air speed, means carried by the aircraft for obtaining the difference between the total air pressure and static air pressure and means for dividing the difference in pressure by the product of the difference in temperature and $$\frac{Rg\gamma}{2k}$$

to obtain true air density.

3. In a device of the character described, a vortex tube mounted on an aircraft, means for measuring the difference in temperature between the air external of said vortex tube and the cold discharge of said vortex tube, means for multiplying said difference by $$\frac{\gamma-1}{2k}$$

and means for measuring the total air temperature and means for subtracting the product from said total air temperature to obtain the static air temperature.

4. In a device of the character described, a vortex tube mounted on an aircraft, means for obtaining a voltage proportional to the difference in temperature between the air externally of said vortex tube and the cold discharge of said vortex tube, multiplying means for modifying said voltage according to $$\frac{\gamma-1}{2k}$$

means for obtaining a second voltage proportional to the total air temperature externally of said vortex tube, means for obtaining a third voltage equal to the difference between said first voltage and said modified voltage, and means for indicating the value of said third voltage.

5. In a device of the character described, a vortex tube mounted on an aircraft, means for obtaining a voltage proportional to the difference in temperature between the air externally of said vortex tube and the cold discharge of said vortex tube, multiplying means for modifying said voltage according to $$\frac{\gamma-1}{2k}$$

means for obtaining a second voltage proportional to the total air temperature externally of said vortex tube, means for indicating the difference between said first voltage and said modified voltage.

6. In a device of the character described, a vortex tube mounted on an aircraft, means for obtaining a voltage proportional to the difference in temperature between the air externally of said vortex tube and the cold discharge of said vortex tube, multiplying means for modifying said voltage according to $$\frac{\gamma-1}{2k}$$

means for obtaining a second voltage proportional to the total air temperature externally of said vortex tube, means for obtaining a third voltage equal to the difference between said first voltage and said modified voltage, computing means energized by said first and third voltages to obtain a fourth voltage proportional to the quotient of the amplitudes of the voltages applied thereto, means for modifying said fourth voltage according to $1/k$, computing means for obtaining a fifth voltage proportional to the square root of the amplitude of said modified fourth voltage, and indicating means connected to said fifth voltage.

7. In a device of the character described, a vortex tube mounted on an aircraft, means for obtaining a voltage proportional to the difference in temperature between the air externally of said vortex tube and the cold discharge of said vortex tube, multiplying means for modifying said voltage according to $$\frac{Rg\gamma}{k}$$

means for obtaining a second voltage proportional to the square root of the amplitude of said modified first voltage and indicating means connected to said second voltage.

8. In a device of the character described, a vortex tube mounted on an aircraft, means for obtaining a voltage proportional to the difference in temperature between the air externally of said vortex tube and the cold discharge of said vortex tube, means carried by said aircraft for producing a second voltage proportional to the difference between the static air pressure and the total air pressure, means for producing a third voltage proportional to the quotient of the amplitudes of said first and second voltages, multiplying means for modifying said third voltage according to $$\frac{2k}{Rg\gamma}$$

and means for indicating the value of said modified voltage.

References Cited in the file of this patent

UNITED STATES PATENTS

| | | |
|---|---|---|
| 1,952,281 | Ranque | Mar. 27, 1934 |
| 2,750,798 | Ruskin et al. | June 19, 1956 |
| 2,764,023 | Vonnegut | Sept. 25, 1956 |

OTHER REFERENCES

Review of Scientific Instruments, vol. 21, No. 2, February 1950, pp. 136–141.